US010399622B2

(12) United States Patent
Riegraf

(10) Patent No.: US 10,399,622 B2
(45) Date of Patent: Sep. 3, 2019

(54) CONVEYING APPARATUS FOR CONVEYING TRANSPORTING STRUCTURES

(71) Applicant: EISENMANN SE, Boeblingen (DE)

(72) Inventor: Martin Riegraf, Reutlingen (DE)

(73) Assignee: EISENMANN SE, Boeblingen (DE)

( * ) Notice: Subject to any disclaimer, the term of this patent is extended or adjusted under 35 U.S.C. 154(b) by 0 days.

(21) Appl. No.: 15/760,241

(22) PCT Filed: Aug. 29, 2016

(86) PCT No.: PCT/EP2016/070333
§ 371 (c)(1),
(2) Date: Mar. 15, 2018

(87) PCT Pub. No.: WO2017/045905
PCT Pub. Date: Mar. 23, 2017

(65) Prior Publication Data
US 2018/0265151 A1 Sep. 20, 2018

(30) Foreign Application Priority Data

Sep. 18, 2015 (DE) .................. 10 2015 012 001

(51) Int. Cl.
B65G 35/06 (2006.01)
B65G 35/00 (2006.01)
B62D 65/18 (2006.01)

(52) U.S. Cl.
CPC ............. B62D 65/18 (2013.01); B65G 35/06 (2013.01); B65G 2201/0294 (2013.01)

(58) Field of Classification Search
None
See application file for complete search history.

(56) References Cited

U.S. PATENT DOCUMENTS 3,848,535 A   11/1974 Mitchell
4,462,522 A *  7/1984 Fluck .................. B65G 27/12
                                                          198/570

(Continued)

FOREIGN PATENT DOCUMENTS

DE    12 68 172      5/1968
EP    1 232 967      8/2002

(Continued)

Primary Examiner — Kavel Singh
(74) Attorney, Agent, or Firm — Schroeder Intellectual Property Law Group, LLC

(57) ABSTRACT

A conveying apparatus for conveying transporting structures with at least one conveying element, in particular transportation skids with a conveying runner in the automotive industry. A conveying route has at least one route unit with at least one longitudinal profile which defines a transporting direction. A drive system for the transporting structures has at least one drive device which is arranged on the at least one longitudinal profile and has at least one drive wheel which can be rotated about an axis of rotation and can be pressed, in the form of a friction wheel, against the conveying element. A bearing structure which bears the drive wheel, is mounted such that it can be pivoted about a pivot axis, and therefore the drive wheel can be moved relative to the longitudinal profile. The pivot axis of the bearing structure runs at an angle to the axis of rotation of the drive wheel.

26 Claims, 7 Drawing Sheets

(56) References Cited

U.S. PATENT DOCUMENTS

| | | | |
|---|---|---|---|
| 5,437,536 A * | 8/1995 | Bianca | E04H 6/245 |
| | | | 414/253 |
| 5,465,827 A | 11/1995 | Nakagawa et al. | |
| 6,354,430 B1 | 3/2002 | Oe | |
| 8,496,103 B2 | 7/2013 | Federmann et al. | |
| 8,771,134 B2 | 7/2014 | Heitplatz | |
| 2002/0108530 A1 | 8/2002 | Masugaki et al. | |
| 2017/0233189 A1 | 8/2017 | Robbin | |
| 2017/0320505 A1 | 11/2017 | Fisk et al. | |

FOREIGN PATENT DOCUMENTS

| | | |
|---|---|---|
| EP | 2 523 878 | 11/2012 |
| FR | 1 370 670 | 8/1964 |
| JP | 2001/151101 | 6/2001 |
| JP | 2005/001437 | 1/2005 |
| WO | 2011/083016 | 7/2011 |
| WO | 2011/085705 | 7/2011 |
| WO | 2016/004516 | 1/2016 |

* cited by examiner

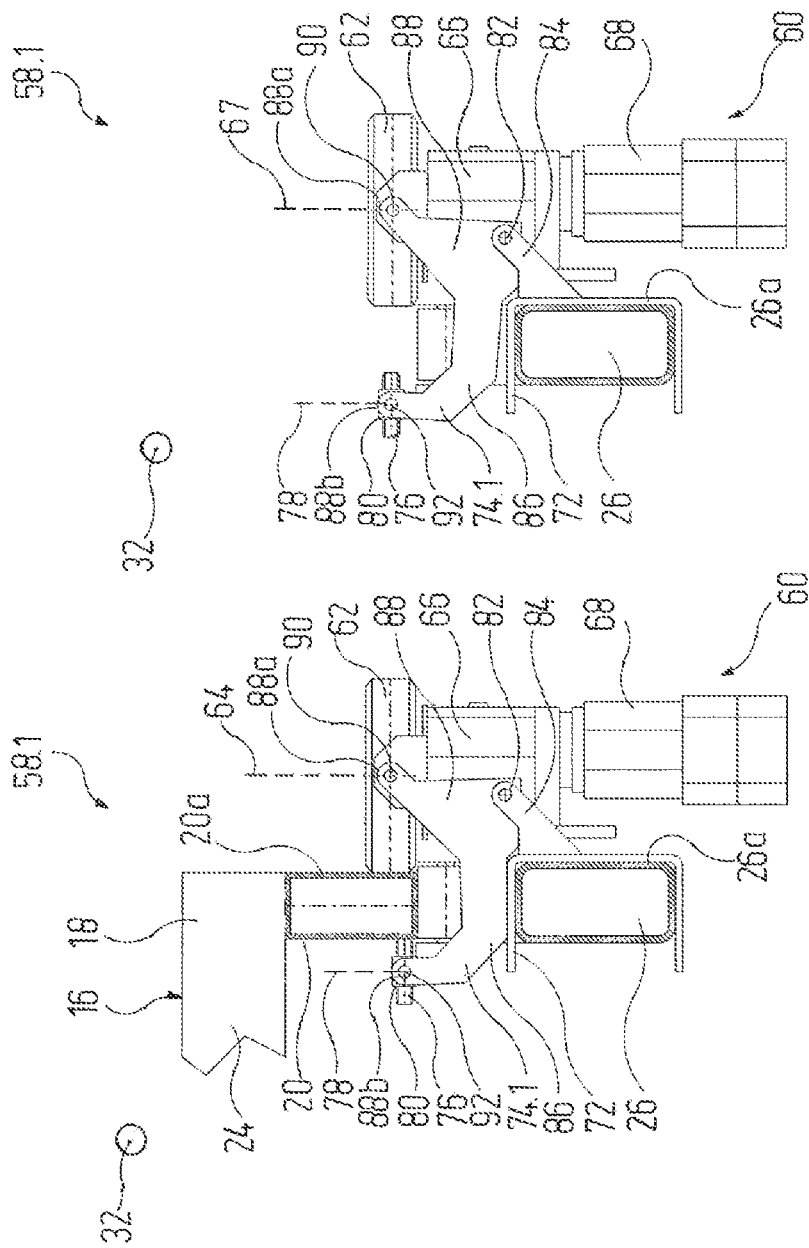

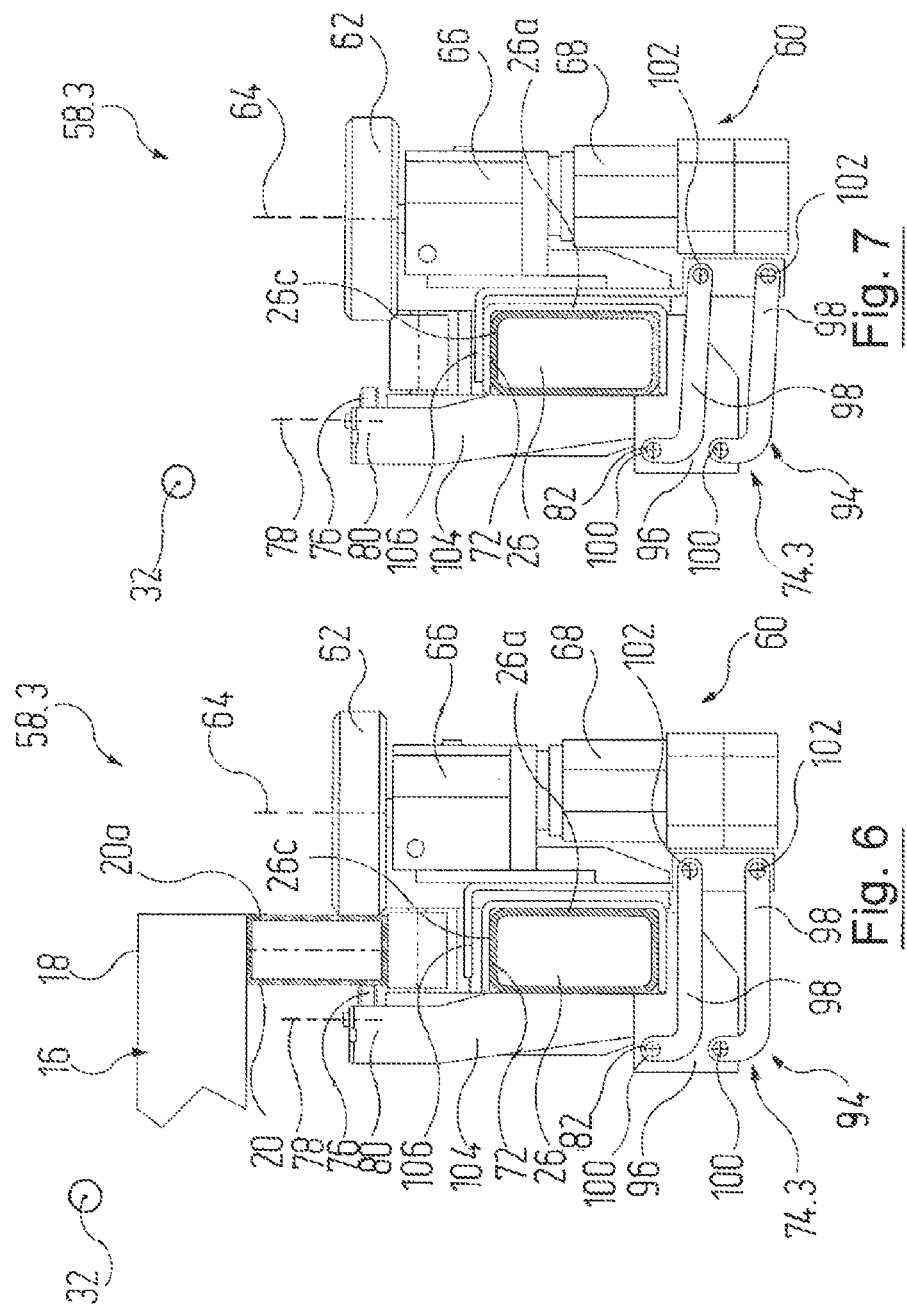

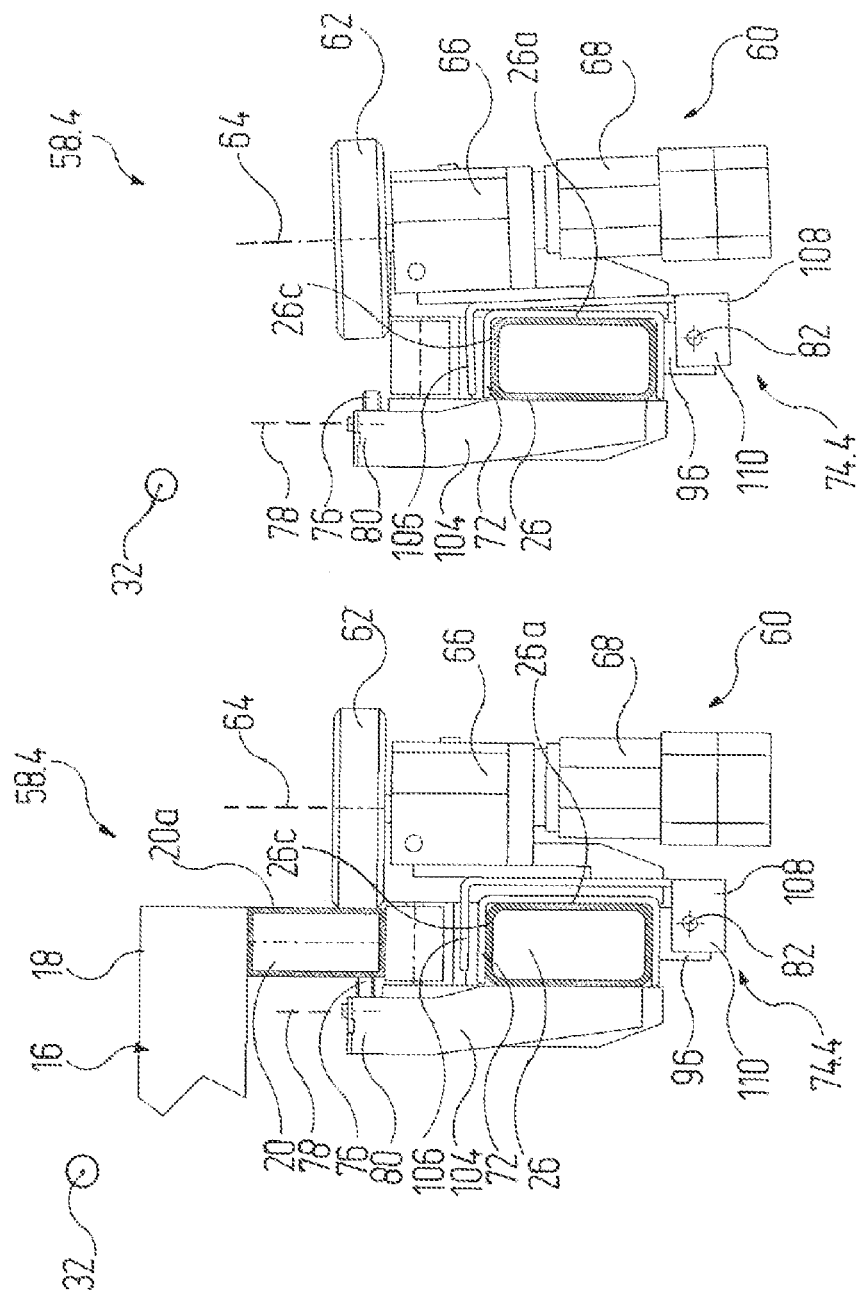

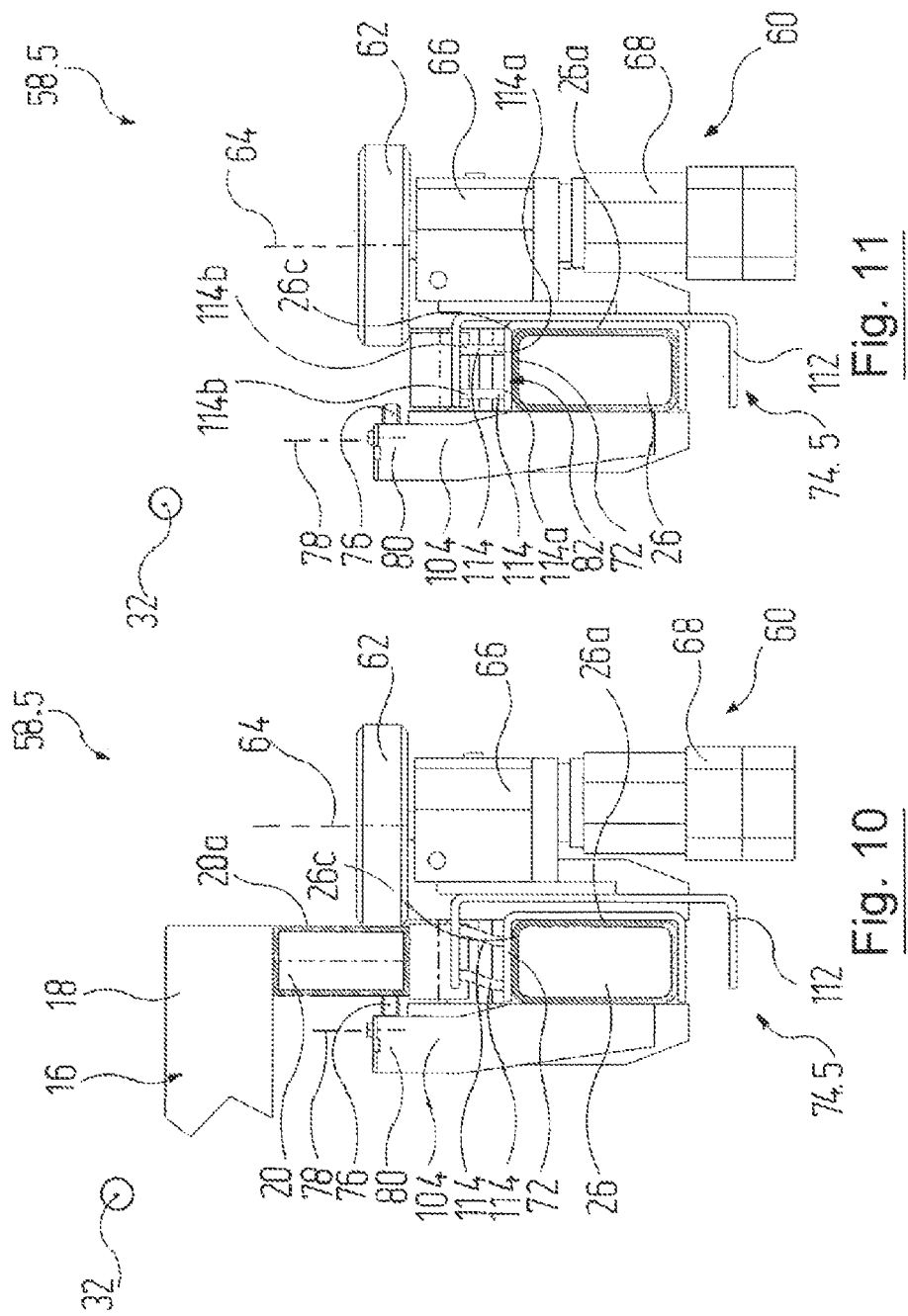

CONVEYING APPARATUS FOR CONVEYING TRANSPORTING STRUCTURES

RELATED APPLICATIONS

This application is a national phase of International Patent Application No. PCT/EP2016/070333 filed Aug. 29, 2016, which claims the filing benefit of German Patent Application No. 10 2015 012 001.8 filed Sep. 18, 2015, the contents of both of which are incorporated herein by reference.

FIELD OF THE INVENTION

The invention relates to a conveying apparatus for conveying transporting structures having at least one conveying element, in particular for conveying within the automotive industry transport skids having a conveying runner, said conveying apparatus comprising a) a conveying track, which comprises at least one track unit having at least one longitudinal profile, which latter defines a direction of transport;
b) a drive system for the transporting structures, having at least one drive device, which is disposed on the at least one longitudinal profile and comprises at least one drive wheel, which is rotatable about a rotational axis and which can be pressed as a friction wheel against the conveying element;
c) a bearing structure, which supports the drive wheel and which is mounted pivotably about a pivot axis, so that the drive wheel is movable relative to the longitudinal profile.

BACKGROUND OF THE INVENTION

Conveying apparatuses of this type are used, for instance in the form of roller conveyors, for the conveyance of transporting structures. In the automotive industry, in particular vehicle bodies, or parts thereof, are transported with such conveying apparatuses between individual machining or treatment stations, such as, for instance, painting stations or dryers. The vehicle bodies, or parts thereof, are here fastened on so-called transport skids, which are known per se. These transport skids have two parallel skid runners, which during transport rest on rollers of the roller conveyor, which rollers are arranged generally in pairs, and one behind another in the direction of conveyance, on the longitudinal profiles of the conveying apparatus. A drive device comprises in practice a drivable roller, which acts on a runner of the transport skid. The drivable roller can be a supporting roller, on which the transport skid rests. Alternatively, the drive device can be configured as a friction wheel drive and comprise a drive wheel which acts laterally on the runner of the transport skid.

It must here be ensured that the drive wheel bears with sufficient force against the conveying runner of the transport skid in order to prevent unwanted slippage of the drive wheel.

In conveying apparatuses known from EP 2 523 878 B1, the bearing structure is a pivoted lever, the pivot axis of which runs parallel to the rotational axis of the drive wheel. The pivot axis of the pivoted lever and the rotational axis of the drive wheel here, in practice, run vertically, but also a solution having horizontal axes is known, wherein the axes there run in a horizontal plane perpendicular to the direction of transport. The mechanical structure is here very complex.

SUMMARY OF THE INVENTION

An object of the invention is now to provide a conveying apparatus of the type stated in the introduction, which at least offers an alternative to the known concepts and creates the possibility of a less complex structure.

This object may be achieved in a conveying apparatus of the type stated in the introduction by virtue of the fact that
d) the pivot axis of the bearing structure runs at an angle to the rotational axis of the drive wheel.

The invention is based on the recognition that it is possible by virtue of this measure, in a departure from the known concepts, to support the drive roller mechanically such that it is movable comparatively easily.

It is here particularly favorable if the angle between the pivot axis of the bearing structure and the rotational axis of the drive wheel is 90 degrees. In this case, within the limits of structural tolerances, deviations of exactly 90 degrees can occur.

Preferredly, the pivot axis of the bearing structure runs, at least with one directional component, in the direction of transport or parallel to the direction of transport. In particular in the case of a parallel path, the drive roller can be moved without a directional component in and counter to the direction of transport.

In order to ensure a reliable advancement of the transporting structure, it is advantageous if the drive device comprises a contrarotating wheel, which cooperates with the drive wheel and is mounted on that side of the longitudinal profile which lies remote from the drive wheel.

The contrarotating wheel is here preferredly mounted in a pretensioning device, by which it is biased in the direction of the drive wheel by a force means, in particular by spring force.

In a first concept, the bearing structure is configured as a swing bracket, which spans the longitudinal profile transversely to the direction of transport, wherein the drive wheel is mounted on a first end portion, and the contrarotating wheel on a second end portion, of the swing bracket.

It is favorable if the drive wheel is mounted on the swing bracket pendulously about a swing axis, and/or the contrarotating wheel is mounted on the swing bracket pendulously about a swing axis, which swing axes run parallel to the pivot axis. By virtue of this measure, the drive wheel and the contrarotating wheel can freely align themselves with the conveying runner of the transport skid, so that a contact with the running surfaces of the conveying runner is made with maximum possible surface contact.

If the drive wheel is mounted on the swing bracket pendulously about the swing axis, the pivot axis of the bearing structure can be disposed at a vertically lower level beneath the swing axis or at a vertically higher level above the swing axis. The two alternatives can be implemented, for instance, in dependence on the structural realities.

Another effective concept can be realized by configuring the bearing structure as a parallelogram guide having at least two pivot arms, which at one end are linked to the longitudinal profile pivotably about respectively a first pivot axis and at the opposite end are connected to the drive wheel pivotably about respectively a second pivot axis, wherein one of the first pivot axes defines the pivot axis of the bearing structure.

In this context and in the present case, by the term "connection" should also in principle be understood indirect connections, a direct connection of two components does not always have to be realized; this is also evident from the description of the individual illustrative embodiments.

The first pivot axes of the pivot arms can be located, in relation to a vertical center plane of the longitudinal profile, on that side of the longitudinal profile which lies remote from the drive wheel; it is then favorable if the first pivot axes are disposed at a, in the vertical direction, lower level than the second pivot axes. Preferably, the pivot arms then run beneath the longitudinal profile.

The first pivot axes of the pivot arms can alternatively also be located, in relation to a vertical center plane of the longitudinal profile, on the same side of the longitudinal profile as the drive wheel; it is then favorable if the first pivot axes are disposed at a, in the vertical direction, higher level than the second pivot axes. In both alternatives, it is then ensured that the drive roller can move due to gravity when it is not pressing against a transporting structure.

In particular, in both alternatives a pretensioning unit for the drive roller can be dispensed with.

In a further variation, it can be provided that the bearing structure is configured as a pivot bracket, which, via a pretensioning unit, is mounted pivotably about the pivot axis, wherein the pretensioning unit is arranged such that the drive wheel is moved toward the conveying element of the transporting structure.

It can here be advantageous if the pivot axis is disposed, in the vertical direction, beneath the longitudinal profile.

In a further variation, the bearing structure can be configured as a bracket, which is connected via at least one leaf spring to the longitudinal profile. An almost linear movement with only slight pivoting can here be obtained if at least one pair of two leaf springs is present.

It can be favorable if the contrarotating wheel as described above is present and is fastened separately from the bearing structure, by means of a bearing unit, to the longitudinal profile.

It is to be understood that the aspects and objects of the present invention described above may be combinable and that other advantages and aspects of the present invention will become apparent upon reading the following description of the drawings and detailed description of the invention.

BRIEF DESCRIPTION OF THE DRAWINGS

Illustrative embodiments of the invention are explained in greater detail below with reference to the drawings, in which:

FIGS. 3 and 4 show a drive module of the roller conveyor, having a drive unit which is displaceable by means of a bearing structure according to a first illustrative embodiment;

FIGS. 6 and 7 show a drive module of the roller conveyor, having a drive unit which is displaceable by means of a bearing structure according to a third illustrative embodiment;

FIGS. 8 and 9 show a drive module of the roller conveyor, having a drive unit which is displaceable by means of a bearing structure according to a fourth illustrative embodiment;

FIGS. 10 and 11 show a drive module of the roller conveyor, having a drive unit which is displaceable by means of a bearing structure according to a fifth illustrative embodiment.

DETAILED DESCRIPTION OF THE PRESENT INVENTION

Figure 1:
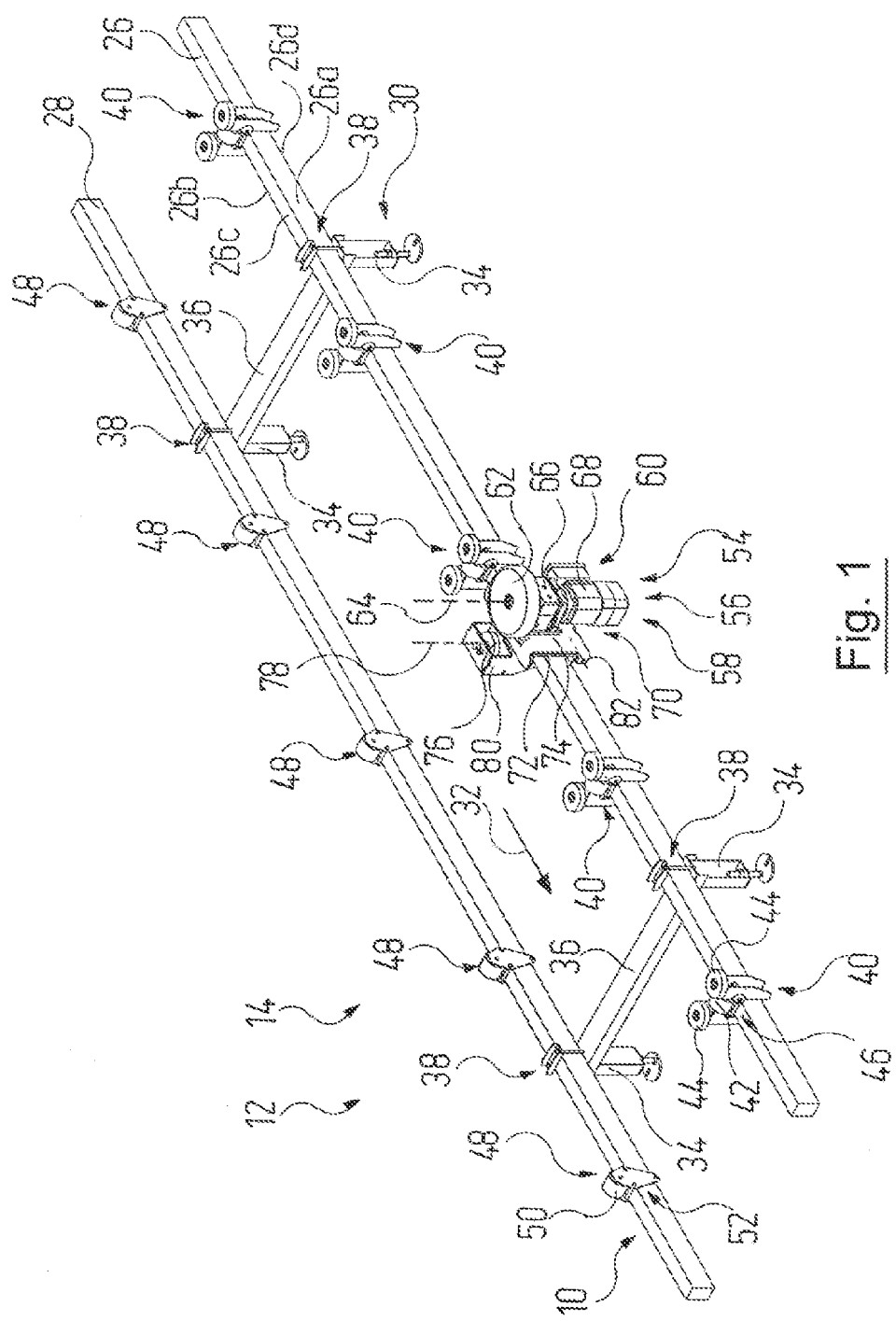
FIG. 1 shows a perspective view of a modularly constructed track unit of a roller conveyor, which, in total, is built up of a plurality of such track units.

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

Figure 2:
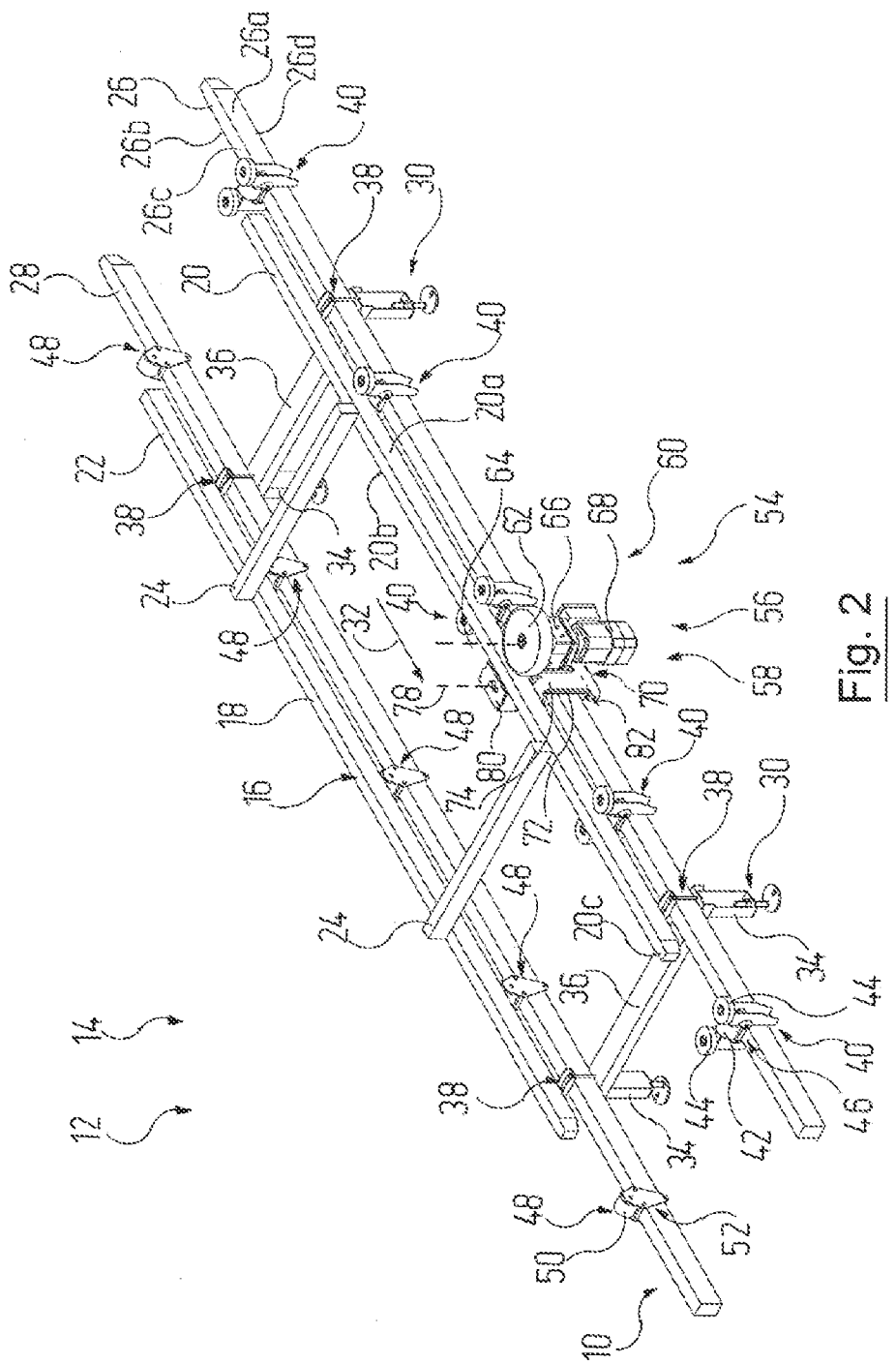
FIG. 2 shows a view, corresponding to FIG. 1, of the track unit of the roller conveyor of FIG. 1, having a transporting structure, which runs down on said track unit, in the form of a transport skid.

Reference is firstly made to FIGS. 1 and 2, which respectively show a modularly constructed track unit 10 of a conveying apparatus 12, which is designed as a roller conveyor 14. The conveying apparatus 12, and consequently the roller conveyor 14, are built up of a plurality of such track units 10. The conveying apparatus 12 thus defines a conveying track, which is formed of a plurality of track units 10 arranged one behind another.

Such a track unit 10 can, however, also exist in a lifting table, a rotary table, a swivel table, a lifting station, or a transverse displacement device of a conveying apparatus 12, as is known per se.

In FIG. 2, a transporting structure 16 for objects to be conveyed, which transporting structure rolls down on the roller conveyor 14, is additionally shown. In the present illustrative embodiment, this is a transport skid 18 as is used in the automotive industry and on which, in a manner which is known per se, one or more objects to be conveyed can be fastened; these include, in particular, vehicle bodies, or parts or add-on parts thereof. In the case of a vehicle body, a transport skid 18 generally receives a vehicle body, whereas smaller objects, such as, for example, add-on parts, are accommodated in once again dedicated transport racks, which are then, for their part, fastened on the transport skid 18. As can be seen in FIG. 2, the transporting structure 16 comprises as the conveying elements two parallel runners 20, 22, which are connected to each other by transverse members 24.

The roller conveyor 14 is designed, in particular, for the materials-handling connection of machining or treatment stations, in which the objects are moved with dedicated materials-handling systems which are tailored to the environmental conditions prevailing in the machining or treatment stations.

A track unit 10 of the roller conveyor 14 comprises two longitudinal profiles 26, 28, which are arranged parallel to each other on supporting frames 30 and are fastened to these, and thus define the direction of transport 32 of the transport skid 18. The direction of transport 32 is illustrated by an arrow, the arrow tip of which, in FIGS. 3 to 5 and 7 to 12, is respectively illustrated by a circle with dot where the direction of transport 32 runs perpendicular to the plane of the paper toward the observer.

In the present illustrative embodiment, two supporting frames 30 per track unit 10 are provided, though also more than two track units 30 can be used for a track unit 10.

When direction specifications such as laterally, at the top, at the bottom, vertically, horizontally or the like are used, these always relate to the components in a roller conveyor 14 installed at the installation site.

In the longitudinal profile 26, the outer side flank is denoted by 26a, the opposite side flank by 26b, the top side, i.e. the conveying side, by 26c, and the bottom side by 26d.

The supporting frames 30 respectively comprise two supporting feet 34, which are fastened to opposite ends of a connecting profile 36 and via which the supporting frames 30 can be anchored to the floor of the site of operation of the roller conveyor 14. The longitudinal profiles 26, 28 of the roller conveyor 14 are respectively detachably connected to the supporting frame 30 with the aid of a supporting frame fastening device 38.

The conveying apparatus 12 comprises guide brackets 40, more than one of which are detachably fastened at regular intervals to one of the longitudinal profiles 26, 28; in the present illustrative embodiment, this is the longitudinal profile 26. The further components of the guide brackets 42 are in FIGS. 1 and 2 provided with reference symbols only in respect of respectively one guide bracket 42. A guide bracket 42 comprises a supporting roller 42, on which the runner 20 of the transporting structure 16 can run down. Furthermore, a guide bracket 42 comprises two guide rollers 44 for the lateral guidance of the transporting structure 16, of which one presses against the outward pointing outer side flank 20a, and the other against the inner side flank 20b, pointing toward the inside of the skid, of the runner 20 of the transport skid 18, when said runner is in the region of the guide bracket 40 and is running down on the supporting roller 42, as can be seen in FIG. 2. During operation, the rotational axis of the supporting roller 42 thus runs horizontally and transversely to the longitudinal members 26, 28, and the rotational axes of the guide rollers 44 run vertically. The guide brackets 40 are detachably fastened by means of a respective guide bracket fastening device 46 to the longitudinal member 26.

The distances between two adjacent guide brackets 40 are geared to the length of the transport skid 18 in such a way that its runner 20 is guided always by at least three guide brackets 40; this is illustrated by FIG. 2. In practice, it is sufficient if the transport skid 18 is guided always by two guide brackets 40.

The conveying apparatus 12 further comprises supporting brackets 48, of which several are detachably fastened at regular intervals to one of the longitudinal profiles 26, 28; in the present illustrative embodiment, this is the longitudinal profile 28. The supporting brackets 48 respectively comprise a supporting roller 50 and are fastened to the longitudinal member 28 with the aid of a supporting bracket fastening device 52.

The supporting brackets 48 are designed such that the runner 22 of the transport skid 18, which runner rolls down on their supporting rollers 50, can move to the side without disturbance of the movement of the transport skid 18. The distances between the runners 20, 22 of various transport skids 18 can turn out to be different, due to structural tolerances. Since one runner 20 in the guide brackets 40 is always guided in such a way that a movement to the side is prevented, these tolerances on the part of the supporting brackets 48 can be compensated, since the second runner 22 can there run off to the side without hindrance.

The distances between two adjacent supporting brackets 48 are geared to the length of the transport skid 18 in such a way that its runner 22 always rests on at least three supporting brackets 48; this is again illustrated by FIG. 2. In practice, it is sufficient if the transport skid 18 is always guided by two supporting brackets 48.

Furthermore, the conveying apparatus 12 comprises, in total, a drive system 54 for the transporting structures 16, said drive system having at least one drive device 56, which, during operation of the conveying apparatus 12, is disposed on one of the longitudinal profiles 26, 28. The drive device 56 operates as a friction wheel drive. It is configured as a drive module 58, which can be detachably fastened to a longitudinal profile 26, 28. In practice, the drive module 58 is attached to the same longitudinal profile 26, 28 which also bears the guide bracket 40; in the present illustrative embodiment, this is the longitudinal profile 26 of the roller conveyor 14.

The conveying apparatus 12 comprises a plurality of drive devices 56 in the form of such drive modules 58, wherein the distance between two adjacent drive modules 58 is tailored such that a conveying structure 16 is always driven by at least one drive module 58.

A drive module 58 comprises a drive unit 60 having a drive wheel 62, which latter is mounted rotatably about a rotational axis 64 and can be pressed as a friction wheel against the conveying runner 20 of the transport skid 18. The drive unit 60 further comprises a transmission block 66 and a motor 68, which drives the drive wheel 62 via the transmission block 66. The motor 68 is an electric motor and is supplied with energy and control signals in a manner which is known per se.

The drive module 58 comprises a drive fastening device 70 and can be detachably fastened with the latter to the longitudinal profile 26. To this end, the drive fastening device 70 comprises a bearing cheek 72 of C-shaped cross section, which embraces the longitudinal profile 26 and supports a bearing structure 74, which latter, for its part, movably supports the drive unit 60 and, in this way, the drive wheel 62. The bearing cheek 72 is on the opposite side of the longitudinal member 26 bolted to a counterplate (not specifically shown) or the like and is in this manner clamped against the longitudinal member 26 and fastened thereto. In one variation (not specifically shown), the bearing cheek 72 can embrace, from the top side, the longitudinal profile 26. Where appropriate, components, which are detailed further below, must then be fastened to the bearing cheek 72 such that they are offset by 90° via angle supports. The bearing cheek 72 can also be plate-shaped and bear only against the side flank 26a of the longitudinal member 26.

The drive module 58 further comprises a contrarotating wheel 76, which is mounted on that side of the longitudinal profile (26) which lies remote from the drive wheel 62 and, situated opposite the drive wheel 62, bears against the inner face 20b of the conveying runner 20 of the transport skid 16 when this is in the region of the drive device 56. The contrarotating wheel 76 is mounted about a rotational axis 78 in a pretensioning device in the form of a pretensioning block 80, by which it is biased by means of spring force in the direction of the drive wheel 62. The distance between the drive wheel 62 and the contrarotating wheel 76 is here, given the maximum deflection of this same in the direction toward the drive wheel 62, smaller than the thickness of the conveying runner 20 of the transport skid 18, so that the contrarotating wheel 76 is always pressed outward counter to the spring force whenever the conveying runner 20 passes between the drive wheel 62 and the contrarotating wheel 76.

When the drive wheel 62 and the contrarotating wheel 76 bear against the runner 20 of a transport skid 18, their rotational axes 64 and 78, respectively, run broadly vertically.

The bearing structure 74, which supports the drive wheel 62, is, for its part, mounted pivotably about a pivot axis 82 which runs at an angle to the rotational axis 64 of the drive wheel 62, whereby the drive wheel 62 can be moved relative to the longitudinal profile 26. In all below-described illustrative embodiments, this angle is 90°, though variations having an angle different than 90°, which angles are greater than 0°, may also be considered. In all below-described illustrative embodiments, the pivot axis 82 runs, moreover, parallel to the conveying direction 32, though variations therefrom, in which the pivot axis 82 of the bearing structure 74 is not parallel to the conveying direction 32, in which the pivot axis 82 of the bearing structure 74 runs at least with one directional component in the direction of transport 32, may also be considered in this regard.

FIGS. 3 to 11 now show five different illustrative embodiments of drive modules 58, which are there respectively denoted by 58.1, 58.2, 58.3, 58.4 and 58.5. The respective bearing structures 74 there bear the reference symbols 74.1, 74.2, 74.3, 74.4 and 74.5. Mutually corresponding components bear the same reference symbols. In FIGS. 1 and 2, the drive module 58.4 is respectively shown with the bearing structure 74.4 according to FIGS. 8 and 9.

In the drive module 58.1 according to FIGS. 3 and 4, two parallel supporting arms 84, of which only one is visible, project outward from the bearing cheek 72 in relation to the longitudinal profile 26. The other of these supporting arms 84 is located behind the plane of the paper, behind the drive unit 60. At their end lying remote from the outer side flank 26a of the longitudinal profile 26, the two supporting arms 84 support the bearing structure 74.1 pivotably about the pivot axis 82. The bearing structure 74.1 is configured as a swing bracket 86, which spans the longitudinal profile 26 of the roller conveyor 14 transversely to the direction of transport 32. The swing bracket 86 has two mutually connected parallel, U-shaped bracket cheeks 88, of which again only one is discernible and the other is disposed behind the plane of the paper, behind the drive unit 60. The two bracket cheeks 88 are coupled, at a first end portion 88a, with the drive wheel 62. For this purpose, the end portions 88a receive the drive unit 60 articulately between them. In the present illustrative embodiment, the drive unit 60—and in this way the drive wheel 62—is mounted pendulously about a swing axis 90 which runs parallel to the pivot axis 82 of the bearing structure 74.1. As a result of the weight of the transmission block 66 and of the motor 68, the drive wheel 62, irrespective of the position of the swing bracket 86, remains oriented broadly such that its rotational axis 64 runs vertically.

At the opposite second end portion 88b, the bracket cheeks 88 receive the pretensioning block 80, and hence the contrarotating wheel 76, between them, wherein this too is pendulously mounted about a swing axis 92 which runs parallel to the pivot axis 82 of the bearing structure 74.1. In the case of the contrarotating wheel 76, mechanical stops (not specifically shown) are present, which delimit the pivoting of the contrarotating wheel 76 about the swing axis 92.

FIG. 3 shows a situation in which the conveying runner 20 of the transport skid 18 is in the region of the drive module 58.1. When the conveying runner 20 passes with its, in the direction of transport 32, front end between the drive wheel 62 and the contrarotating wheel 76, the contrarotating wheel 76 is firstly pressed outward counter to the bias until the spring force offers too great a resistance and pivots the swing bracket 86 about the pivot axis 82. As a result of the swing mounting, the drive roller 62 and the contrarotating wheel 76 are here oriented such that they bear full-facedly against the side flanks 20a and 20b of the conveying runner 20.

As can be seen in FIG. 2, the side flanks 20a, 20b of the conveying runner 20, and its running surface on the bottom side, converge in a, in the direction of transport 32, front end portion 20c, so that the conveying runner 20, in the end portion 20c, tapers in the direction of transport 32. The second conveying runner 22 of the transport skid 18 is correspondingly configured. It is hereby avoided that the drive roller 62 or the contrarotating wheel 76 suffers a shock when the transport skid 18 passes into a drive module 58. In some embodiments (not specifically shown), also just the side flanks 20a, 20b, or perhaps all outer faces, i.e. including the outer face on the top side of the conveying runner 20, can converge in the direction of transport 32.

Once the transport skid 18 has passed through the drive module 58.1, the swing bracket 86 pivots back again. For the limitation of the pivot path of the swing bracket 86 in the outward direction, a mechanical stop (not specifically shown) is present. FIG. 4 shows this situation, in which the swing bracket 86 is pivoted as far as possible to the right about the pivot axis 82.

In the case of the drive module 58.1, the pivot axis 82 of the bearing structure 74.1 lies at a vertically lower level beneath the swing axes 90 and 92 of the drive unit 60 and of the contrarotating wheel 76, respectively.

Figure 5:
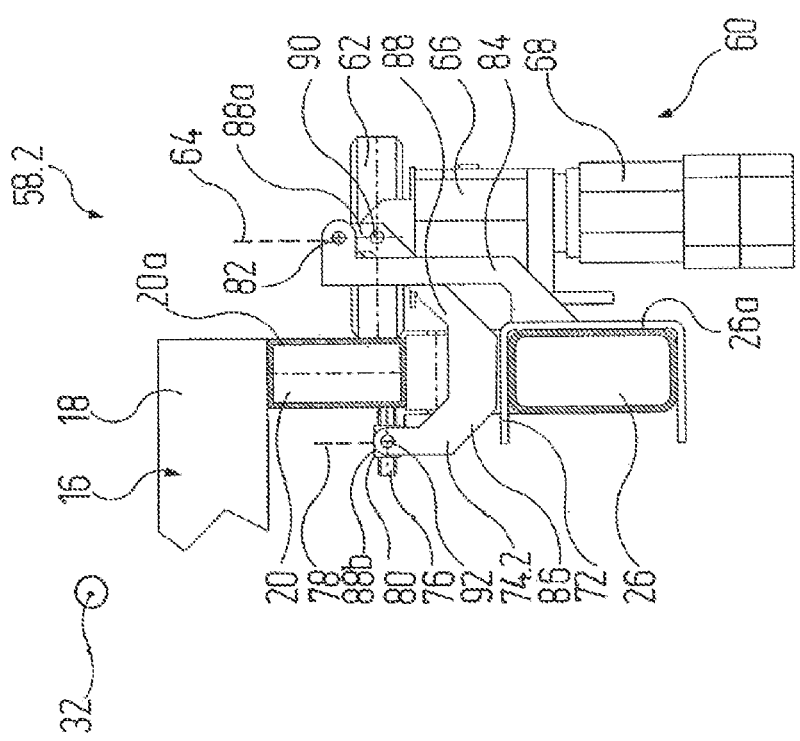
FIG. 5 shows a drive module of the roller conveyor, having a drive unit which is displaceable by means of a bearing structure according to a second illustrative embodiment.

In the drive module 58.2 according to FIG. 5, the pivot axis 82 of the there-situated bearing structure 74.2 is located at a vertically higher level above the swing axes 90 and 92. For this purpose, the bracket cheeks 88 of the swing bracket 86 comprise an end portion 88a extended beyond the pivot mounting of the drive unit 60 on the swing bracket 86. Via this end portion 88a, the bearing structure 74.2 is mounted above the swing axis 90 of the drive unit 60, pivotably about the pivot axis 82, on the supporting arm 84, for which purpose the supporting arm 84 extends upward at appropriate distance from the bearing cheek 72.

In the drive module 58.3 according to FIGS. 6 and 7, the drive wheel 62 is not swing-mounted, but is fastened to the longitudinal profile 26 with the aid of a parallelogram guide 94. For this purpose, the bearing cheek 72 bears on its bottom side two vertically downward protruding supporting cheeks 96, of which only one is discernible. The other supporting cheek 96 is located behind the plane of the paper. The supporting cheeks 96 respectively support two pivot arms 98 of the parallelogram guide 94, which are pivotable on the supporting cheeks 96 about a first pivot axis 100 and extend in the direction of the drive unit 60. At the ends lying remote from the first pivot axes 100, the pivot arms 98 are hinge-fastened to the drive unit 60 pivotably about a respective second pivot axis 102 and are in this way hinge-connected to the drive wheel 62.

In the present illustrative embodiment, the pivot arms 98 run beneath the longitudinal profile 26; their first pivot axes 100 are located, in relation to the vertical center plane of the longitudinal profile 26, on that side of the longitudinal profile 26 which lies remote from the drive wheel 62. The pivot arms 98 thereby cross the path of movement of the conveying runner 20 of the transport skid 18. In this case, the first pivot axes 100 on the supporting cheeks 96 are disposed at a, in the vertical direction, higher level than the second pivot axes 102 on the drive unit 60.

In one variation (not specifically shown), the first pivot axes 100 of the pivot arms 98 can also be disposed, in relation to the vertical center plane of the longitudinal profile 26, on the same side as the drive unit 60 or the drive wheel 62. In this case, the first pivot axes 100 on the supporting cheeks 96 are disposed at a, in the vertical direction, lower level than the second pivot axes 102 on the drive unit 60.

In this illustrative embodiment, the bearing structure 74.3 for the drive wheel 62 is formed by pivot arms 98 of the parallelogram guide 94, wherein the pivot axis 82 of the bearing structure 74.3 is defined by one of the pivot axes 100 on the supporting cheeks 96. The pivot axes 100 and the pivot axes 102 run parallel to one another.

Unlike the drive modules 58.1 and 58.2, in which the contrarotating wheel 76 is likewise supported by the respective bearing structure 74.1 and 74.2, in the drive module 58.3 the contrarotating wheel 76 is separated from the bearing structure 74.3 in the pretensioning block 80 and is here fastened in a positionally fixed manner to the longitudinal profile 26 with the aid of a bearing unit 104. Nor, in this case, is the contrarotating wheel 76 swing-mounted.

Once a transport skid 18 has passed through the drive module 58.3, the drive unit 60 moves downward due to gravity. In order that the drive unit 60 can move only up to a defined lower position, the drive unit 60 bears a stop element 106, which extends over the top side 26c of the longitudinal profile 26. The drive unit 60 can thereby move into a lower position only to the point where the stop element 106 rests on the top side 26c of the longitudinal profile 26 or on the there-situated part of the bearing cheek 72, as is illustrated by FIG. 7.

The parallelogram guide 94 is designed such that the distance between the drive roller 62 and the contrarotating roller 76 is smaller in this lower position of the drive unit 60 than in a higher position of the drive unit 60.

When a transport skid 18 now passes into the drive module 58.3, its conveying runner 20 forces the drive wheel 62 outward. The drive wheel 62 can escape this force influence by way of a corresponding upward movement of the drive unit 60. The parallelogram guide 94 ensures that the drive wheel 62, during its movement, remains always horizontally oriented with vertical rotational axis 64 and in this way always bears vertically, linearly or full-facedly, against the side flank 26a of the longitudinal profile 26.

In the drive module 58.4 according to FIGS. 8 and 9, the there-situated bearing structure 74.4 is not configured as a parallelogram guide, but as a pivot bracket 108, which is rigidly coupled with the drive unit 60 and, in the vertical direction beneath the longitudinal profile 26, is mounted on the supporting cheeks 96 on the bottom side of the bearing cheek 72, via a pretensioning unit 110, pivotably about the pivot axis 82. The pretensioning unit 110 is arranged such that the drive unit 60 is acted upon with a spring force in such a way that the drive wheel 62 is moved toward the conveying runner 20 of the transport skid 18. Thus the drive wheel 62 is moved toward the contrarotating wheel 76 when there is no transport skid 18 in the region of the drive module 58.4; this is illustrated by FIG. 9. The stop element 106 limits in this case the movement of the drive wheel 62 toward the contrarotating wheel 76. The rotational axes 64 and 78 of the drive wheel 62 and of the contrarotating wheel 76 are in this case no longer parallel.

When a transport skid 18 passes into the drive module 58.4, the drive wheel 62 is pushed outward by the conveying runner 20, whereby the drive unit 60 pivots outward counter to the spring force of the pretensioning unit 110 about the pivot axis 82 and, as a result of the spring force of the pretensioning unit 110, presses against the side flank 20a of the conveying runner 20.

In the drive module 58.5 according to FIGS. 10 and 11, the there-situated bearing structure 74.5 is formed by a bracket 112 of C-shaped cross section, which, from the side flank 26a of the longitudinal profile 26, embraces the bearing cheek 72. The bracket 112 is rigidly coupled with the drive unit 60 and connected via leaf springs 114 to the bearing cheek 72, which leaf springs allow the bracket 112, and hence the drive unit 60, to pivot in relation to fastening ends 114a of the leaf springs 114 to the bearing cheek 72. The fastening ends 114a and the opposite fastening ends 114b of the leaf springs 114 are provided with reference symbols only in FIG. 11.

In this illustrative embodiment, the pivot axis 82 of the bearing structure 74.5 is a virtual pivot axis, which is defined by one of the fastening ends 114a of the two leaf springs 114 to the bearing cheek 72.

When the transport skid 18 passes into the drive module 58.5, its conveying runner 20 exerts on the drive wheel 62 a force by which the bracket 112, and hence the drive unit 60, is moved outward. As a result of the restoring force of the leaf springs 114, the drive wheel 62 presses always against the side flank 20a of the conveying runner 20.

In the drive module 58.5, the leaf springs 114 run vertically in the sense that their opposite fastening ends 114a, 114b are spaced apart in the vertical direction, but not in the horizontal direction.

In one variation (not specifically shown), the drive unit 60 is fastened via one or more leaf springs to the bearing cheek 72, wherein the leaf springs run horizontally in such a way that their opposite fastening ends are spaced apart in the horizontal direction, but not in the vertical direction.

It is to be understood that additional embodiments of the present invention described herein may be contemplated by one of ordinary skill in the art and that the scope of the present invention is not limited to the embodiments disclosed. While specific embodiments of the present invention have been illustrated and described, numerous modifications come to mind without significantly departing from the spirit of the invention, and the scope of protection is only limited by the scope of the accompanying claims.

What is claimed is:

1. A conveying apparatus for conveying transporting structures having at least one conveying element, in particular for conveying within automotive industry transport skids having a conveying runner, the conveying apparatus comprising:
   a) a conveying track, which comprises at least one track unit having at least one longitudinal profile, which latter defines a direction of transport;
   b) a drive system for transporting structures, the drive system having at least one drive device, which is disposed on the at least one longitudinal profile and comprises at least one drive wheel, the drive wheel being rotatable about a rotational axis and which can be pressed as a friction wheel against a conveying element;
   c) a bearing structure which supports the drive wheel and which is mounted pivotably about a pivot axis so that the drive wheel is movable relative to the longitudinal profile
   wherein
   d) the pivot axis of the bearing structure runs at an angle to the rotational axis of the drive wheel,
   wherein the bearing structure is configured as a parallelogram guide having at least two pivot arms, which at one end are linked to the longitudinal profile pivotably about respectively a first pivot axis and at the opposite end are connected to the drive wheel pivotably about respectively a second pivot axis, wherein one of the first pivot axes defines the pivot axis of the bearing structure.

2. The conveying apparatus as claimed in claim 1, wherein the angle between the pivot axis of the bearing structure and the rotational axis of the drive wheel is 90 degrees.

3. The conveying apparatus as claimed in claim 1, wherein the pivot axis of the bearing structure runs, at least with one directional component, in the direction of transport or parallel to the direction of transport.

4. The conveying apparatus as claimed in claim 1, wherein the drive device comprises a contrarotating wheel, which cooperates with the drive wheel and is mounted on that side of the longitudinal profile which lies remote from the drive wheel.

5. The conveying apparatus as claimed in claim 4, wherein the contrarotating wheel is mounted in a pretensioning device, by which it is biased in the direction of the drive wheel by a spring force.

6. The conveying apparatus as claimed in claim 1, wherein the first pivot axes of the pivot arms are located, in relation to a vertical center plane of the longitudinal profile, on that side of the longitudinal profile which lies remote from the drive wheel, and the first pivot axes are disposed at a, in the vertical direction, lower level than the second pivot axes.

7. The conveying apparatus as claimed in claim 6, wherein the first pivot axes of the pivot arms are located, in relation to a vertical center plane of the longitudinal profile, on the same side of the longitudinal profile as the drive wheel, and the first pivot axes are disposed at a, in the vertical direction, higher level than the second pivot axes.

8. The conveying apparatus as claimed in claim 1, wherein a contrarotating wheel, which cooperates with the drive wheel and is mounted on that side of the longitudinal profile which lies remote from the drive wheel, is present and is fastened separately from the bearing structure, by means of a bearing unit, to the longitudinal profile.

9. A conveying apparatus for conveying transporting structures having at least one conveying element, in particular for conveying within automotive industry transport skids having a conveying runner, the conveying apparatus comprising:
   a) a conveying track, which comprises at least one track unit having at least one longitudinal profile, which latter defines a direction of transport;
   b) a drive system for transporting structures, the drive system having at least one drive device, which is disposed on the at least one longitudinal profile and comprises at least one drive wheel, the drive wheel being rotatable about a rotational axis and which can be pressed as a friction wheel against a conveying element;
   c) a bearing structure which supports the drive wheel and which is mounted pivotably about a pivot axis so that the drive wheel is movable relative to the longitudinal profile
   wherein
   d) the pivot axis of the bearing structure runs at an angle to the rotational axis of the drive wheel,
   wherein the bearing structure is configured as a pivot bracket, which, via a pretensioning unit, is mounted pivotably about the pivot axis, wherein the pretensioning unit is arranged such that the drive wheel is moved toward the conveying element of the transporting structure.

10. The conveying apparatus as claimed in claim 9, wherein the angle between the pivot axis of the bearing structure and the rotational axis of the drive wheel is 90 degrees.

11. The conveying apparatus as claimed in claim 9, wherein the pivot axis of the bearing structure runs, at least with one directional component, in the direction of transport or parallel to the direction of transport.

12. The conveying apparatus as claimed in claim 9, wherein the drive device comprises a contrarotating wheel, which cooperates with the drive wheel and is mounted on that side of the longitudinal profile which lies remote from the drive wheel.

13. The conveying apparatus as claimed in claim 12, wherein the contrarotating wheel is mounted in a pretensioning device, by which it is biased in the direction of the drive wheel by a spring force.

14. The conveying apparatus as claimed in claim 9, wherein the pivot axis is disposed, in the vertical direction, beneath the longitudinal profile.

15. A conveying apparatus for conveying transporting structures having at least one conveying element, in particular for conveying within automotive industry transport skids having a conveying runner, the conveying apparatus comprising:
   a) a conveying track, which comprises at least one track unit having at least one longitudinal profile, which latter defines a direction of transport;
   b) a drive system for transporting structures, the drive system having at least one drive device, which is disposed on the at least one longitudinal profile and comprises at least one drive wheel, the drive wheel being rotatable about a rotational axis and which can be pressed as a friction wheel against a conveying element;
   c) a bearing structure which supports the drive wheel and which is mounted pivotably about a pivot axis so that the drive wheel is movable relative to the longitudinal profile
   wherein
   d) the pivot axis of the bearing structure runs at an angle to the rotational axis of the drive wheel,
   wherein the drive device comprises a contrarotating wheel, which cooperates with the drive wheel and is mounted on that side of the longitudinal profile which lies remote from the drive wheel and the contrarotating wheel is mounted in a pretensioning device, by which it is biased in the direction of the drive wheel by a spring force.

16. The conveying apparatus as claimed in claim 15, wherein the angle between the pivot axis of the bearing structure and the rotational axis of the drive wheel is 90 degrees.

17. The conveying apparatus as claimed in claim 15, wherein the pivot axis of the bearing structure runs, at least with one directional component, in the direction of transport or parallel to the direction of transport.

18. The conveying apparatus as claimed in claim 15, wherein the bearing structure is configured as a swing bracket, which spans the longitudinal profile transversely to the direction of transport, wherein the drive wheel is mounted on a first end portion, and the contrarotating wheel on a second end portion, of the swing bracket.

19. The conveying apparatus as claimed in claim 18, wherein the drive wheel is mounted on the swing bracket pendulously about a swing axis, and/or the contrarotating wheel is mounted on the swing bracket pendulously about a swing axis, which swing axes run parallel to the pivot axis.

20. The conveying apparatus as claimed in claim 19, wherein the drive wheel is mounted on the swing bracket pendulously about the swing axis, and the pivot axis of the bearing structure is disposed at a vertically lower level beneath the swing axis.

21. The conveying apparatus as claimed in claim 15, wherein the bearing structure is configured as a parallelogram guide having at least two pivot arms, which at one end are linked to the longitudinal profile pivotably about respectively a first pivot axis and at the opposite end are connected to the drive wheel pivotably about respectively a second pivot axis, wherein one of the first pivot axes defines the pivot axis of the bearing structure and the first pivot axes of the pivot arms are located, in relation to a vertical center plane of the longitudinal profile, on that side of the longitudinal profile which lies remote from the drive wheel, and the first pivot axes are disposed at a, in the vertical direction, lower level than the second pivot axes.

22. The conveying apparatus as claimed in claim 21, wherein the first pivot axes of the pivot arms are located, in relation to a vertical center plane of the longitudinal profile, on the same side of the longitudinal profile as the drive wheel, and the first pivot axes are disposed at a, in the vertical direction, higher level than the second pivot axes.

23. The conveying apparatus as claimed in claim 1, wherein the bearing structure is configured as a pivot bracket, which, via a pretensioning unit, is mounted pivotably about the pivot axis, wherein the pretensioning unit is arranged such that the drive wheel is moved toward the conveying element of the transporting structure and the pivot axis is disposed, in the vertical direction, beneath the longitudinal profile.

24. The conveying apparatus as claimed in claim 15, wherein the bearing structure is configured as a bracket, which is connected via at least one leaf spring to the longitudinal profile.

25. The conveying apparatus as claimed in claim 21, wherein a contrarotating wheel, which cooperates with the drive wheel and is mounted on that side of the longitudinal profile which lies remote from the drive wheel, is present and is fastened separately from the bearing structure, by means of a bearing unit, to the longitudinal profile.

26. The conveying apparatus as claimed in claim 19, wherein the drive wheel is mounted on the swing bracket pendulously about the swing axis, and the pivot axis of the bearing structure is disposed at a vertically higher level above the swing axis.

\* \* \* \* \*